(12) United States Patent
Potter

(10) Patent No.: US 6,854,330 B2
(45) Date of Patent: *Feb. 15, 2005

(54) ACCELEROMETER AND METHODS THEREOF

(75) Inventor: Michael D. Potter, Churchville, NY (US)

(73) Assignee: Nth Tech Corporation, Churchville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/280,299

(22) Filed: Oct. 24, 2002

(65) Prior Publication Data

US 2003/0079543 A1 May 1, 2003

Related U.S. Application Data

(60) Provisional application No. 60/339,258, filed on Oct. 26, 2001.

(51) Int. Cl.$^7$ ............................. G01P 15/00; H02N 1/00
(52) U.S. Cl. ................................ 73/514.25; 73/514.32; 310/309
(58) Field of Search .................... 73/514.25, 514.32, 73/514.36; 361/281, 283.3, 283.4; 310/309, 308

(56) References Cited

U.S. PATENT DOCUMENTS

| | | | |
|---|---|---|---|
| 3,742,767 A | | 7/1973 | Bernard et al. |
| 4,102,202 A | * | 7/1978 | Ferriss ..................... 73/514.18 |
| 4,736,629 A | | 4/1988 | Cole |
| 4,922,756 A | | 5/1990 | Henrion |
| 5,050,435 A | | 9/1991 | Pinson |
| 5,088,326 A | | 2/1992 | Wada et al. |
| 5,092,174 A | | 3/1992 | Reidemeister et al. |
| 5,095,752 A | | 3/1992 | Suzuki et al. |
| 5,367,429 A | | 11/1994 | Tsuchitani et al. |
| 5,392,650 A | | 2/1995 | O'Brien et al. |
| 5,417,312 A | * | 5/1995 | Tsuchitani et al. ........ 73/514.36 |
| 5,488,864 A | | 2/1996 | Stephan |
| 5,616,844 A | * | 4/1997 | Suzuki et al. ............. 73/514.32 |
| 5,635,739 A | | 6/1997 | Grieff et al. |
| 5,747,692 A | * | 5/1998 | Jacobsen et al. ......... 73/514.25 |
| 5,920,011 A | | 7/1999 | Hulsing, II |
| 5,969,250 A | | 10/1999 | Greiff |
| 6,149,190 A | | 11/2000 | Galvin et al. |
| 6,170,332 B1 | | 1/2001 | MacDonald et al. |
| 6,199,874 B1 | | 3/2001 | Galvin et al. |
| 6,750,590 B2 | * | 6/2004 | Potter ......................... 310/309 |

FOREIGN PATENT DOCUMENTS

JP          2000304567 A    * 11/2000    .......... G01D/5/241

OTHER PUBLICATIONS

S. Kobayashi et al., "Distribution of Trapped Electrons at Interface State in ACTFEL Devices," in *Proceedings of the Sixth International Workshop on Electroluminescence*, El Paso, Texas, May 11–13, (1992).

Alberto Aguilera, ViJay P. Singh, and David Morton, "Electron Energy Distribution at the Insulator–Semiconductor Interface in AC Thin Film Electroluminescent Display Devices," *IEEE Transactions on Electron Devices*, vol. 41. No. 8, Aug. (1994).

* cited by examiner

Primary Examiner—Hezron Williams
Assistant Examiner—Jacques M. Saint-Surin
(74) Attorney, Agent, or Firm—Nixon Peabody LLP

(57) ABSTRACT

An accelerometer includes a housing with a chamber, a member with a stored static charge, and a pair of electrodes connected to the housing. The member is connected to the housing and extends at least partially across the chamber. The pair of electrodes are each spaced from and on substantially opposing sides of the member from each other and are at least partially in alignment with each other. The member is movable with respect to the pair of electrodes or one of the pair of electrodes is movable with respect to the member.

33 Claims, 10 Drawing Sheets

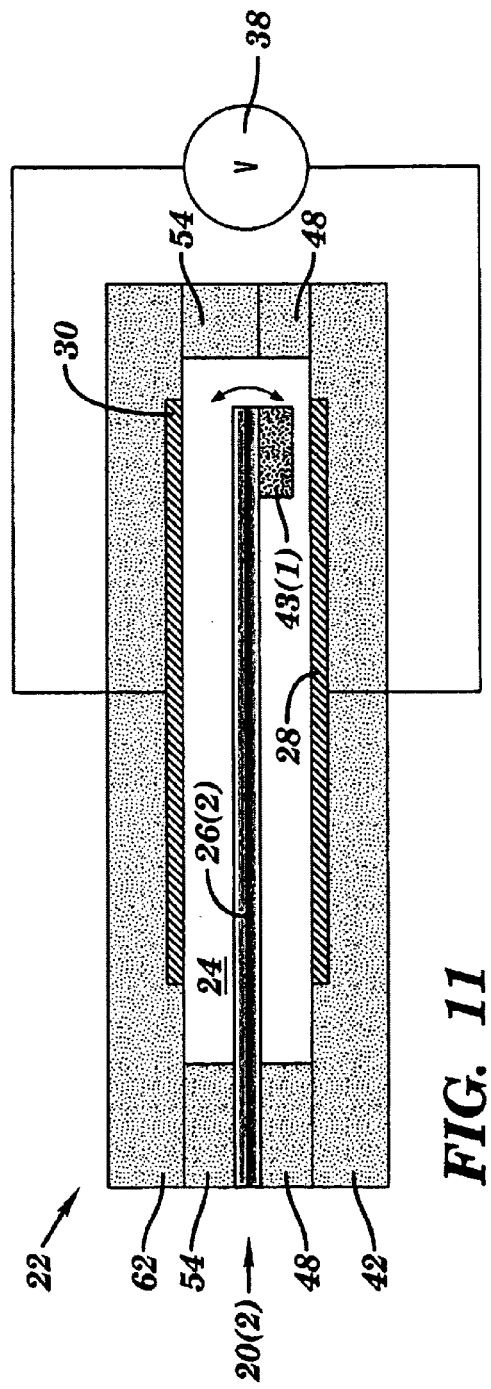
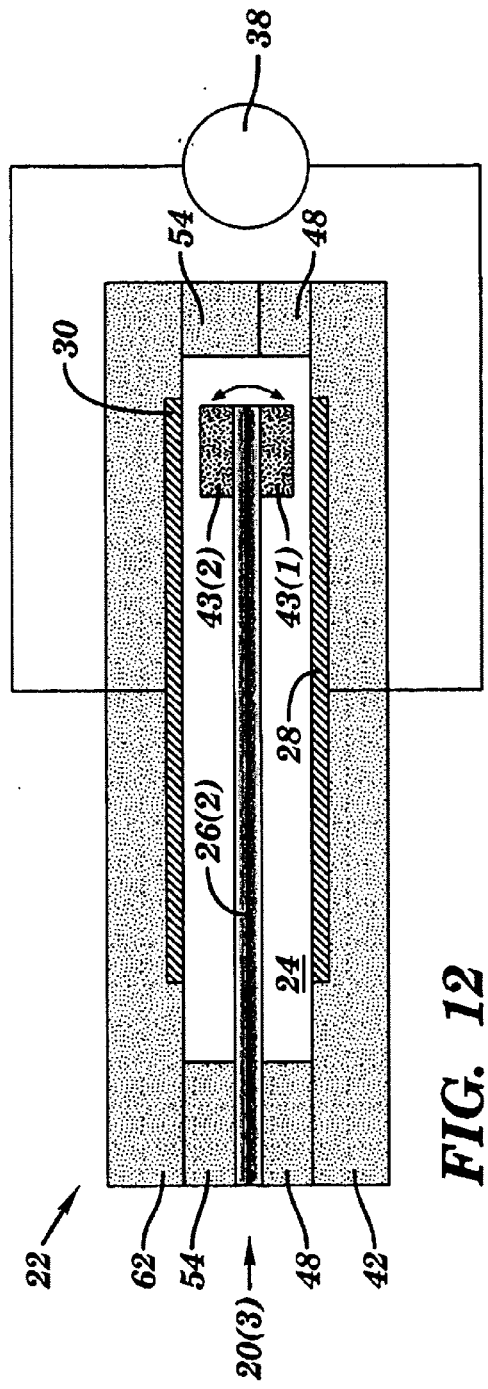
FIG. 11
FIG. 12

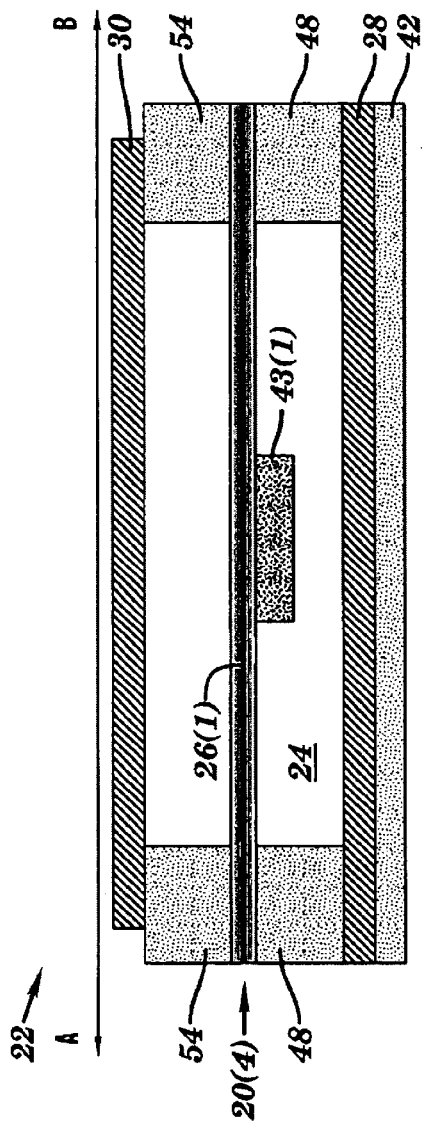
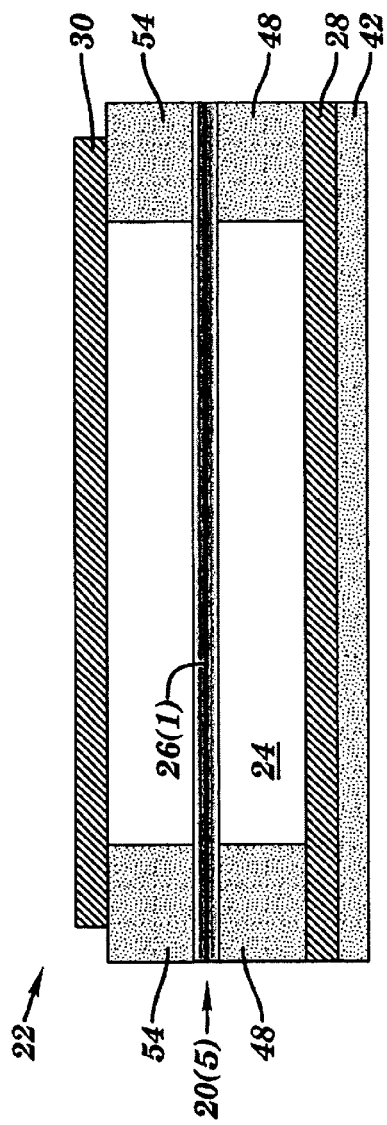

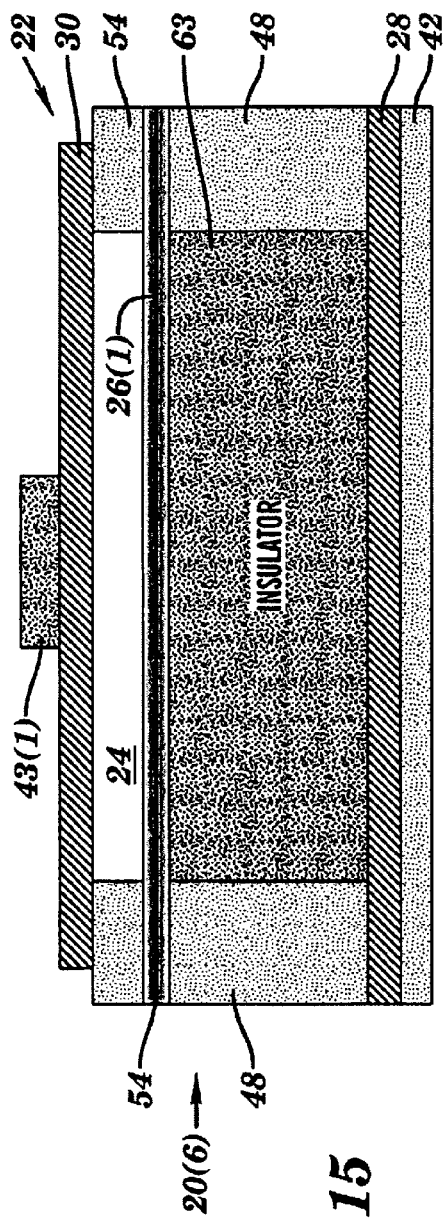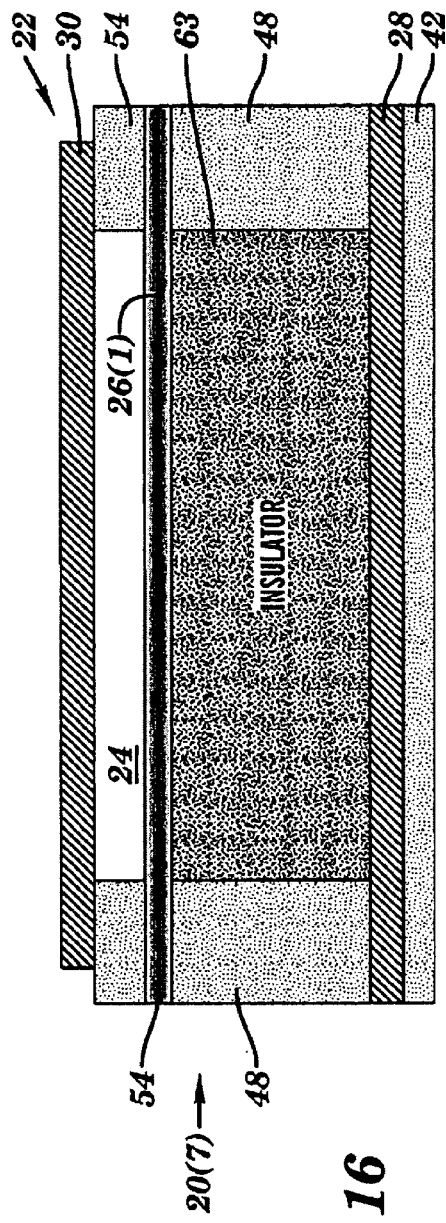
FIG. 15
FIG. 16

US 6,854,330 B2

ACCELEROMETER AND METHODS THEREOF

The present invention claims the benefit of U.S. Provisional Patent Application Ser. No. 60/339,258, filed Oct. 26, 2001, which is hereby incorporated by reference in its entirety.

FIELD OF THE INVENTION

This invention generally relates to accelerometers and, more particularly, relates to a high sensitivity accelerometer and methods thereof.

BACKGROUND OF THE INVENTION

Typically, conventional accelerometers have a mass attached to a resilient, movable member and a stationary member. The stationary member together with the movable member form two plates of a capacitor. As the spacial position of the movable member is changed at non-constant rates, the mass moves toward or away from a stationary member. The change in the separation of the stationary and movable members results in a change in capacitance which can be correlated to a change in acceleration.

Although these prior accleremeters work, they have some limitations. For example, typically these prior accelerometers have been complex MEMS devices with large numbers of interdigitated "comb" fingers that are needed to create a capacitor difference large enough to be interpreted. As a result, these prior devices are large and expensive to manufacture.

SUMMARY OF THE INVENTION

An accelerometer in accordance with one embodiment of the present invention includes a housing with a chamber, a member with a stored static charge, and a pair of electrodes connected to the housing. The member is connected to the housing and extends at least partially across the chamber. The pair of electrodes are each spaced from and on substantially opposing sides of the member from each other and are at least partially in alignment with each other. The member is movable with respect to the pair of electrodes or one of the pair of electrodes is movable with respect to the member.

A method for making an accelerometer in accordance with another embodiment of the present invention includes providing a housing with a chamber, providing a member with a stored static charge, and providing a pair of electrodes connected to the housing. The member is connected to the housing and extends at least partially across the chamber. The pair of electrodes are each spaced from and on substantially opposing sides of the member from each other and are at least partially in alignment with each other. The member is movable with respect to the pair of electrodes or one of the pair of electrodes is movable with respect to the member.

A method for measuring acceleration in accordance with another embodiment of the present invention includes exposing a member with a stored static charge to an acceleration. Exposing the member to the acceleration cause the member to be displaced. The displacement produces a potential difference on a pair of electrodes. The electrodes are spaced from and on substantially opposing sides of the member from each other and are at least partially in alignment with each other. The potential difference which is output represents a measurement of the acceleration.

The present invention provides an accelerometer which is much more sensitive than prior accelerometers. For example, with the present invention an accelerometer with a member with a typical charge density of $5 \times 10^{12}$ charges/cm$^2$ and an electrode spacing of 1 µm, an average displacement of 0.01 angstrom yields an output potential of 1 mV. Since the sensitivity of the present invention is high, the accelerometer also can be made smaller than prior accelerometers. It can be designed for high acceleration forces, such as artillery shell firing or very sensitive for other applications, such as ones in a micro gravity environment. The present invention can be used in a variety of different applications, such as in air bags, anti-lock braking systems, unsafe maneuver warning, smart beams, sway sensors, and robotic craft guidance systems.

BRIEF DESCRIPTION OF THE DRAWINGS

FIG. 11 is a side, cross-sectional view of an accelerometer with a cantilever beam member with a mass in accordance with another embodiment of the present invention;

FIG. 12 is a side, cross-sectional view of an accelerometer with a cantilever beam member with a pair of masses in accordance with another embodiment of the present invention;

FIG. 13 is a side, cross-sectional view of an accelerometer with a diaphragm member with a mass in accordance with another embodiment of the present invention;

FIG. 14 is a side, cross-sectional view of an accelerometer with a diaphragm member in accordance with another embodiment of the present invention;

FIG. 15 is a side, cross-sectional view of an accelerometer with a movable electrode with a mass in accordance with another embodiment of the present invention;

FIG. 16 is a side, cross-sectional view of an accelerometer with a movable electrode in accordance with another embodiment of the present invention.

DETAILED DESCRIPTION

Figure 8:
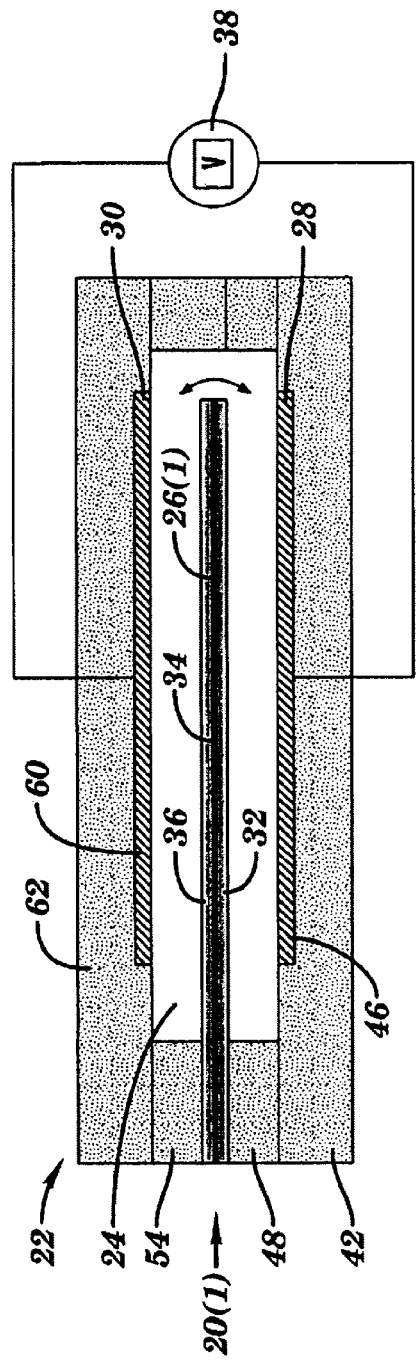

An accelerometer 20(1) in accordance with one embodiment of the present invention is illustrated in FIG. 8. The accelerometer 20(1) includes a housing 22 with a chamber 24, a member 26(1) with a stored static charge, and a pair of electrodes 28 and 30. The present invention provides an accelerometer 20(1) which is more sensitive and more compact than prior accelerometers.

Figure 7:
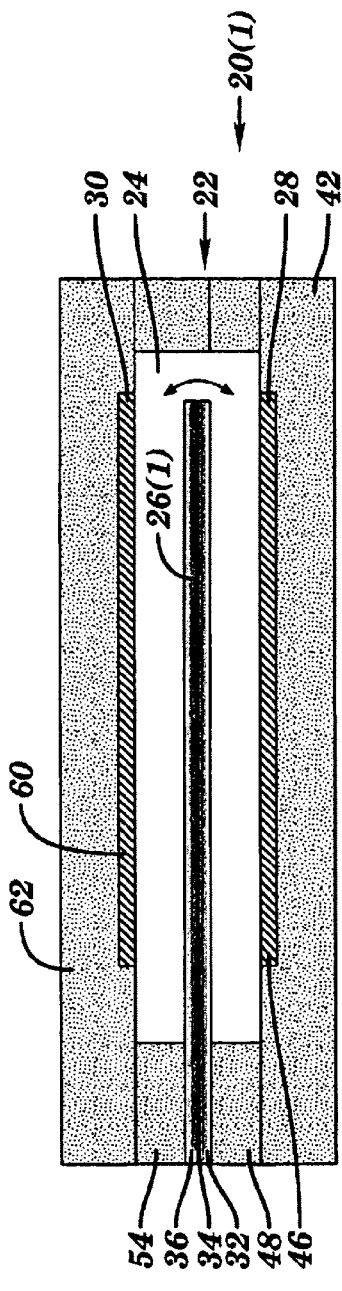

Referring to FIGS. 7 and 8, the housing 22 has an internal chamber 24 and is made of a variety of layers, although other types of supporting structures in other configurations and other numbers of layers, such as one or more, made of other materials can be used. The size of the housing 22 and of the chamber 24 can vary as required by the particular application.

The member 26(1) is connected to the housing along one edge and extends across the chamber 24 and is spaced from an inner wall of the housing 22, although other arrangements can be used, such as having the all of the edges of the member 26(1) secured to housing 22. Each of the first and second electrodes 28 and 30 is initially spaced the same distance from the member 26(1), although other configurations can be used. The chamber 24 is sealed with a fluid, such as air or is in a vacuum, although other types of fluids and/or materials can be used. The position of the member 26(1) can be altered as a result of an acceleration, although other configurations can be used, such as having the member 26(1) being fixed and one of the pair of electrodes 28 or 30 whose position can be altered as a result of an acceleration.

The member 26(1) can store a static charge and in this particular embodiment comprises a pair of layers 32 and 36 of dielectric material, such as silicon oxide, silicon dioxide, silicon nitride, aluminum oxide, tantalum oxide, tantalum pentoxide, titanium oxide, titanium dioxide, barium strontium titanium oxide, although other types of materials which can hold a charge and other numbers of layers, such as a member 26(2) with one layer 37 shown in FIG. 11 or three or more layers can be used. The layers 32 and 36 are seated against each other along an interface 34 were the static charge is stored. The member 26(1) can hold a fixed charge on the order of at least $1 \times 10^{10}$ charges/cm$^2$.

The pair of electrodes 28 and 30 are located in the inner walls of the housing 22 in chamber 24, although other configurations for connecting the pair of electrodes 28 and 30 to the housing 22 can be used, such as having each of the first and second electrodes 28 and 30 located in the inner wall of the housing 22 and spaced from the chamber 24 by one or more layers of material, such as an insulating material, or by having each of the first and second electrodes 28 and 30 seated on the inner walls of the housing 22 in the chamber 24. The first and second electrodes 28 and 30 are in substantial alignment with each other and are spaced from and located on a substantially opposing sides of the member 26(1), although other configurations can be used. By way of example only, the distance between each of the pair of electrodes 28 and 30 is about 1.0 microns, although this distance can vary. Depending on the material and/or fluid in the chamber 24, the electrodes 28 and 30 may be spaced different distances from the member 26(1). In this particular embodiment, this spacing is determined so that the electrodes 28 and 30 with respect to the member 26(1) have a potential difference of zero at an initial state, although other arrangements can be used.

An accelerator monitoring system 38, such as a voltmeter, is coupled to the pair of electrodes 28 and 30, although other types of devices can be coupled to the electrodes 28 and 30. With the present invention, a high density of static electronic charge of at least $5 \times 10^{12}$ charges/cm$^2$ is stored in member 26(1). As a result, a very small average displacement of the member 26(1) with respect to electrodes 28 and 30, on the order of less than one angstrom, yields a significant potential difference on the electrodes 28 and 30, which can be read and displayed by accelerator monitoring system 38.

Referring to FIGS. 11–12, accelerometers 20(2)–20(3) in accordance with other embodiments are shown. Elements in FIGS. 11–12 which are like elements shown and described in FIGS. 1–8 will have like numbers and will not be shown and described in detail again here. The member 26(2) comprises a single layer 37 of dielectric material, such as such as silicon oxide, silicon dioxide, silicon nitride, aluminum oxide, tantalum oxide, tantalum pentoxide, titanium oxide, titanium dioxide, barium strontium titanium oxide, in which the static charge is held, although the member 26(2) can have other numbers of layers. A mass 43(1) is connected adjacent one end of member 26(2) as shown in FIG. 11, although the mass 43 can be connected to other locations on member 26(2). Additionally, other numbers of mass can be used, such as a pair of masses 43(1) and 43(2) connected adjacent one end of and opposing sides of member 26(2) as shown in FIG. 12. The mass 43(1) or masses 43(1) and 43(2) makes the accelerometer 20(2) and 20(3) more sensitive.

Referring to FIGS. 13–14, accelerometers 20(4)–20(5) in accordance with other embodiments are shown. Elements in FIGS. 11–12 which are like elements shown and described in FIGS. 1–8 will have like numbers and will not be shown and described in detail again here. In this particular embodiment, member 26(1) extends across the chamber 24 and is connected along all sides to housing 22 to form a diaphragm and an insulating layer 62 is not deposited over the electrode 30, although other configurations can be used. A mass 43(1) may be connected to the member 26(1) as shown in FIG. 13, although other numbers of masses can be connected to member 26(1) or the member 26(1) may have no mass connected to it as shown in FIG. 14.

Referring to FIGS. 15–16, accelerometers 20(6)–20(7) in accordance with other embodiments are shown. Elements in FIGS. 11–12 which are like elements shown and described in FIGS. 1–8 will have like numbers and will not be shown and described in detail again here. In this particular embodiment, an insulating layer 63 is located between and connects electrode 28 to member 26(1), although other arrangements can be used, such as just having insulating layer 48 extend across electrode 28 and connect electrode 28 to member 26(1). Since the material and/or fluid between electrode 28 and member 26(1) is different from the material and/or fluid between electrode 30 and member 26(1), the spacing between the electrode 28 and member 26(1) is different from the spacing between electrode 30 and member 26(1). The spacing or thickness is determined based on the permittivity of the material and/or fluid between electrode 28 and member 26(1) and the permittivity of the material and/or fluid between electrode 28 and member 26(1) so that at an initial state there is a zero potential difference between electrodes 28 and 30, although other arrangements can be used. Additionally, in this particular embodiment electrode 30 is fabricated to be flexible and responsive to an acceleration. The responsiveness of the electrode 30 can be adjusted based on factors, such as the thickness of the electrode 30, the material used to make electrode 30, and the acceleration to be sensed. A mass 43 is connected to the electrode 30 to make the accelerometer 20(6) more sensitive, although other numbers of masses can be connected to electrode 30 or the electrode 30 may have no mass connected to it as shown in FIG. 16.

Figure 17:
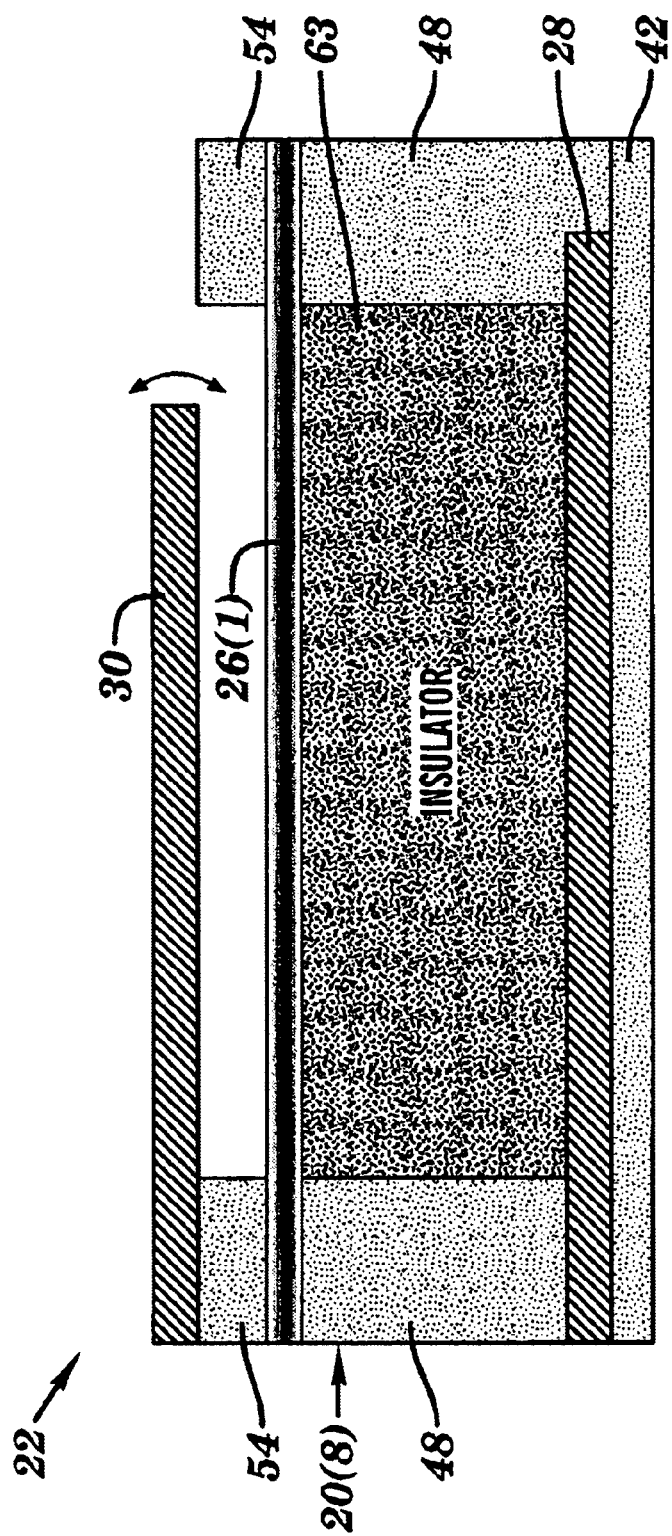
FIG. 17 is a side, cross-sectional view of an accelerometer with a movable cantilever beam member in accordance with another embodiment of the present invention.

Referring to FIG. 17, an accelerometer 20(8) in accordance with another embodiment is shown. Elements in FIG. 17 which are like elements shown and described in FIGS. 1–8 and 15–16 will have like numbers and will not be shown and described in detail again here. In this particular embodiment, the electrode 30 is connected at one end to housing 22 and the other end of electrode 30 is free so that electrode 30 forms a cantilever beam, although other arrangements can be used.

Figure 1:
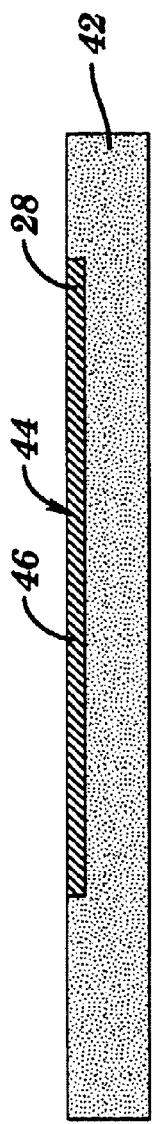
FIGS. 1–8 are side, cross-sectional views of a method for making an accelerometer in accordance with one embodiment of the present invention.

A method for making a accelerometer 20(1) in accordance with one embodiment of the present invention is described below with reference to FIGS. 1–8. To make an accelerometer 20(1) a suitable substrate 42, such as silicon oxide on silicon, is provided as shown in FIG. 1, although other types of materials could be used. A first trench 44 is formed in the substrate 42 and the first trench 44 is filled with a first conductive layer 46, such as aluminum, although other types of materials could be used. The first conductive layer 46 may be planarized so that only the first trench 44 is filled with the first conductive layer 46. By way of example, this may be done by standard chemical mechanical planarization (CMP) processing, although other techniques can be used. The resulting first conductive layer 46 in the first trench 44 forms the first electrode 28.

Figure 2:
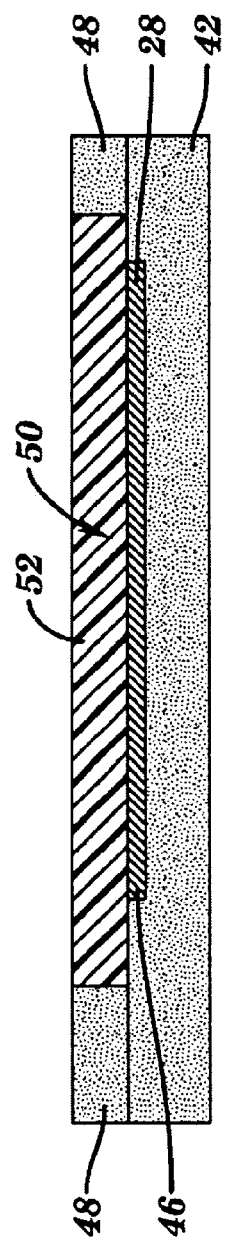

Referring to FIG. 2, a first insulating layer 48, such as silicon dioxide, is deposited on the first conductive layer 46 and a portion of the substrate 42, although other types of materials could be used. A second trench 50 is formed in the first insulating layer 48 which is at least in partial alignment with the first electrode 28. The second trench 50 is etched to the surface of the first electrode 28, although other configurations can be used, such as leaving a portion of the first insulating layer 48 over the first electrode 28. The second trench 50 is filled with a first sacrificial layer 52, such as poly silicon, and may be planarized, although other types of materials could be used for first sacrificial layer 52. By way of example, the planarizing of the first sacrificial layer 52 may be done by standard CMP processing, although other techniques can be used.

Figure 3:
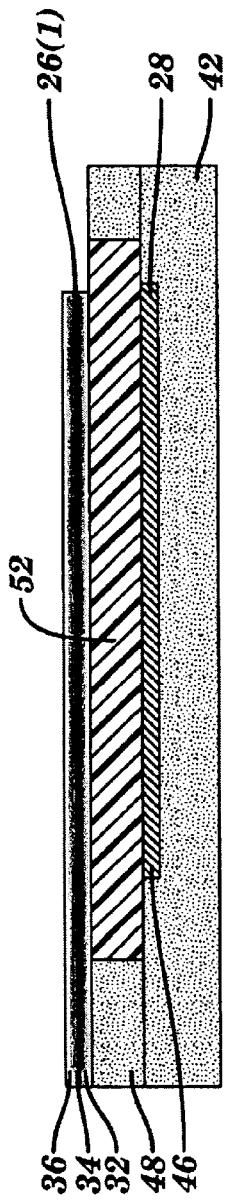

Referring to FIG. 3, a member 26(1) which can store an electronic charge, such as a fixed or floating charge, is deposited on a portion of the first insulating layer 48 and the first sacrificial material 52 so that the member 26(1) is spaced from one portion of the first insulating layer 48, although other arrangements can be used. In this particular embodiment, the member 26(1) comprises two layers 32 and 36 of insulating material, such as silicon oxide and silicon nitride, silicon oxide and aluminum oxide, or any other combination of materials that can store fixed charge can be deposited as the member 26(1). Additionally, the member 26(1) may comprise other numbers of layers of material, such as a member 26(2) with a single layer 37 shown in FIG. 9 or multiple layers. For example, a tri-layer of silicon oxide—silicon nitride—silicon oxide may be used. The member 26(1) can move towards and away from the first electrode 28 and the second electrode 30, although other arrangements can be used, such as where the member 26(1) is fixed with respect to one of the electrodes 28 or 30 and one of the electrodes 28 or 30 can move with respect to member 26(1) and the other electrode 28 or 30.

Electronic charge is injected into the member 26(1). A variety of techniques for injecting charge can be used, such as a low to medium energy ballistic electron source or by utilizing a sacrificial conductive layer (not shown) disposed on top of the member 26(1) and subsequently applying an electric field sufficient to inject electrons into the member 26(1).

Figure 9:
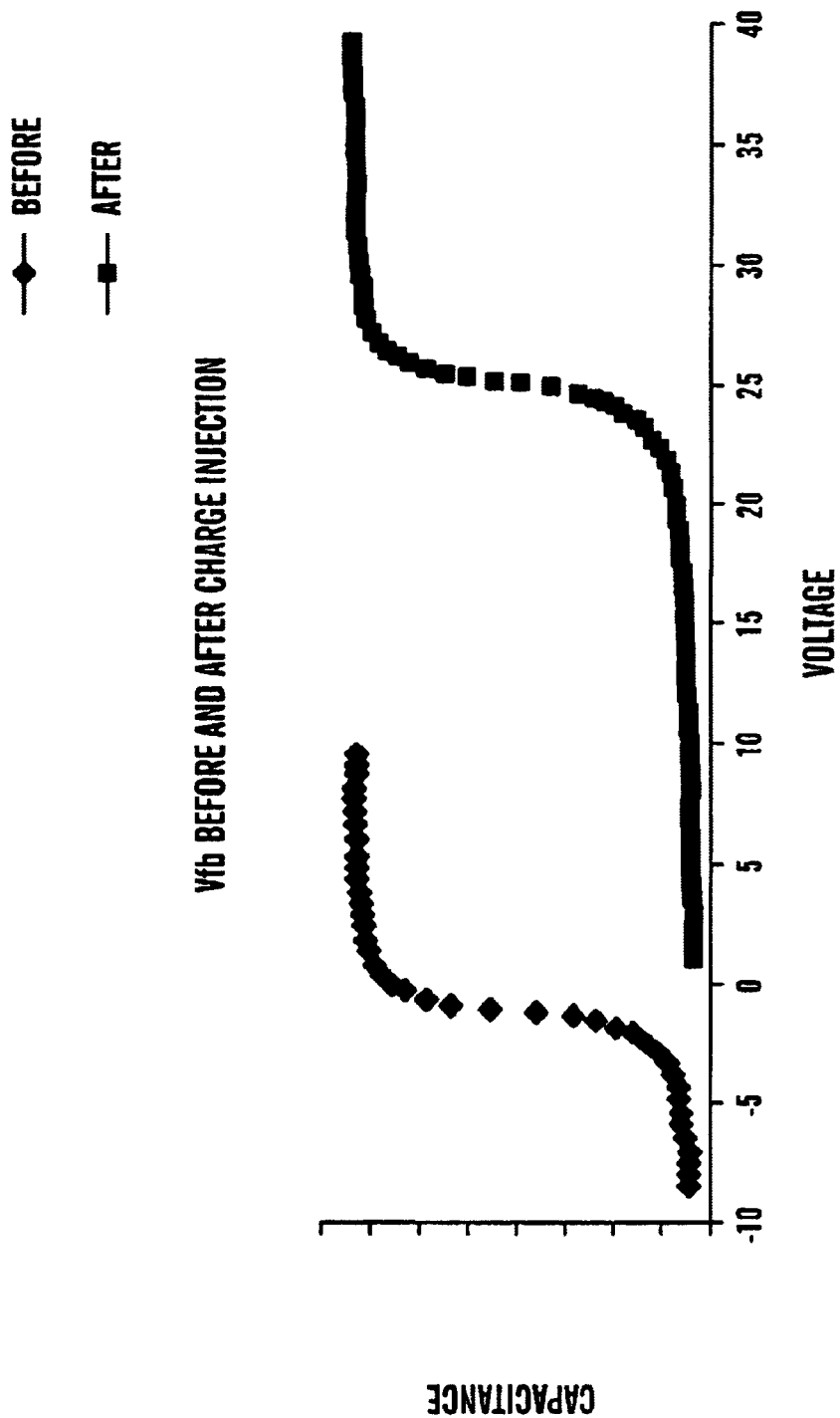
FIG. 9 is a graph illustrating flat band voltages as a function of stored charge.
Figure 10:
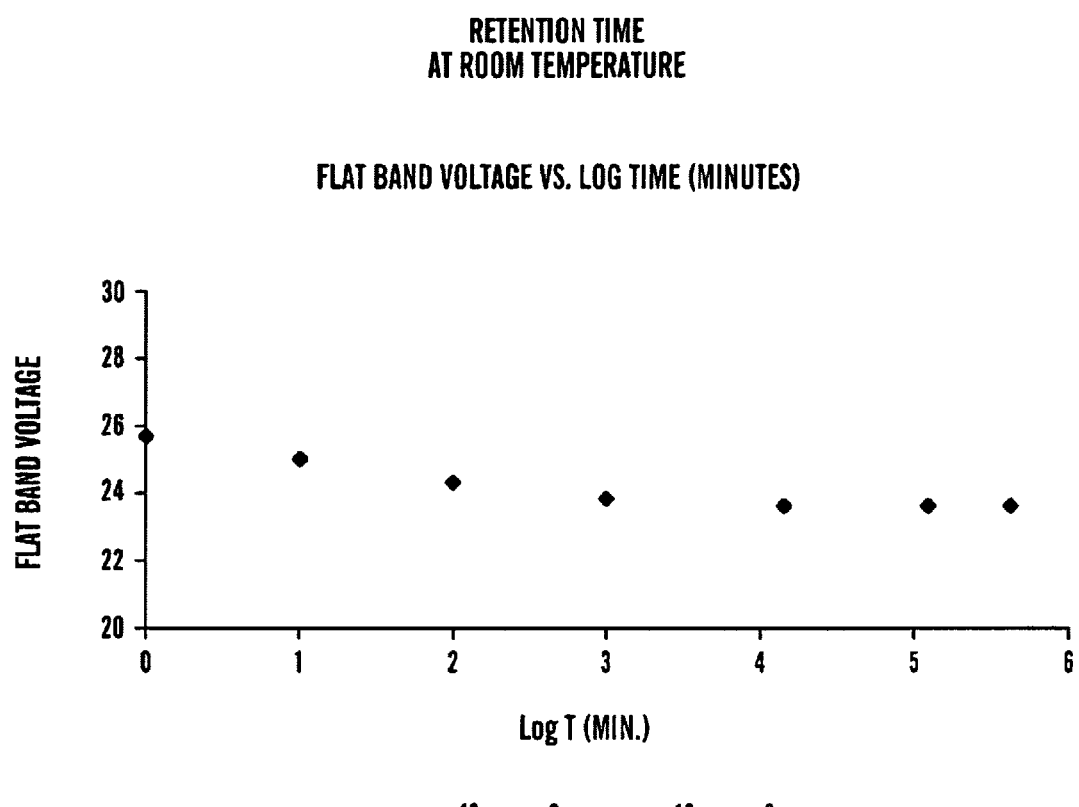
FIG. 10 is graph of flat band voltage as a function of log time (minutes)

By way of example only, a test structure using a lightly doped n-type semiconductor wafer for the first electrode 28 and aluminum for the second electrode 30 was fabricated in order to measure the magnitude and retention time of embedded charge. Flat band voltage was measured as a means to determine stored charge densities before and after high field electron charge injection. As indicated in FIG. 9, post electron injection results showed a stored charge density of $1 \times 10^{13}$ electrons per $cm^2$. The flat band voltage was subsequently measured and plotted as a function of log time in minutes in order to determine charge loss rate at room temperature ambient as shown in FIG. 10. The first two decades showed a loss of 0.7 V per decade. The third decade had a reduced loss rate. The flat band voltage stabilized after a few decades to a value indicating a charge density of $9.2 \times 10^{12}$ electrons per $cm^2$. The results obtained at room temperature show a significant amount of stored charge will remain in the structure for many years.

Figure 4:
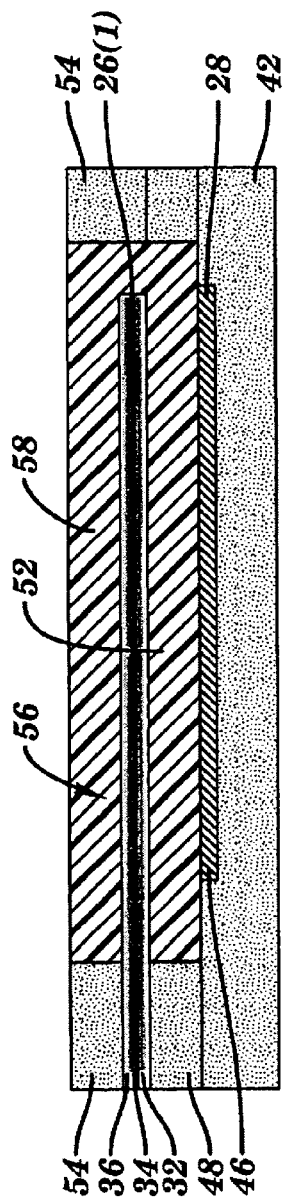

Referring to FIG. 4, a second insulating layer 54, such as silicon dioxide is deposited on the member 26(1), although other types of materials can be used. Next, a third trench 56 is etched in the second insulating layer 54 to the member 26(1), although the third trench 56 can be etched to other depths. The third trench 56 is in substantial alignment with the second trench 50, although other arrangements can be used as long as the third trench 56 is at least in partial alignment with the second trench 50. The third trench 56 is filled with a second sacrificial material 58, such as polysilicon, although other types of material can be used. The second sacrificial material 58 may be planarized.

Figure 5:
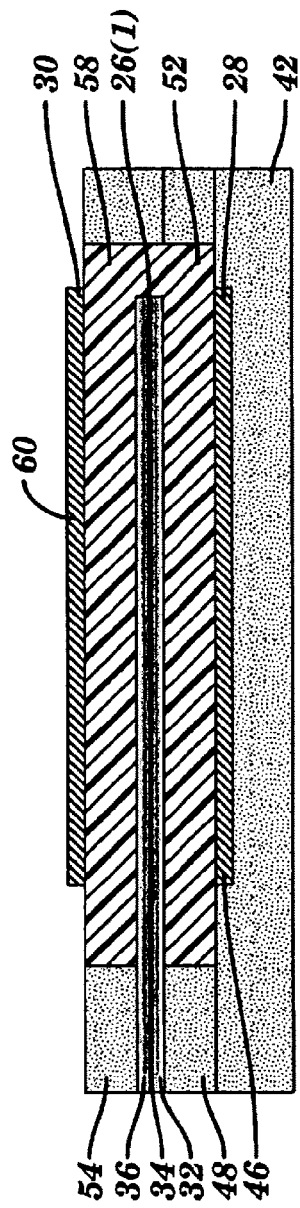

Referring to FIG. 5, a second conductive layer 60, such as aluminum, is deposited on at least a portion of the second insulating layer 54 and the second sacrificial material 58, although other types of materials can be used. The second conductive layer 60 forms the second electrode 30 in this embodiment.

Figure 6:
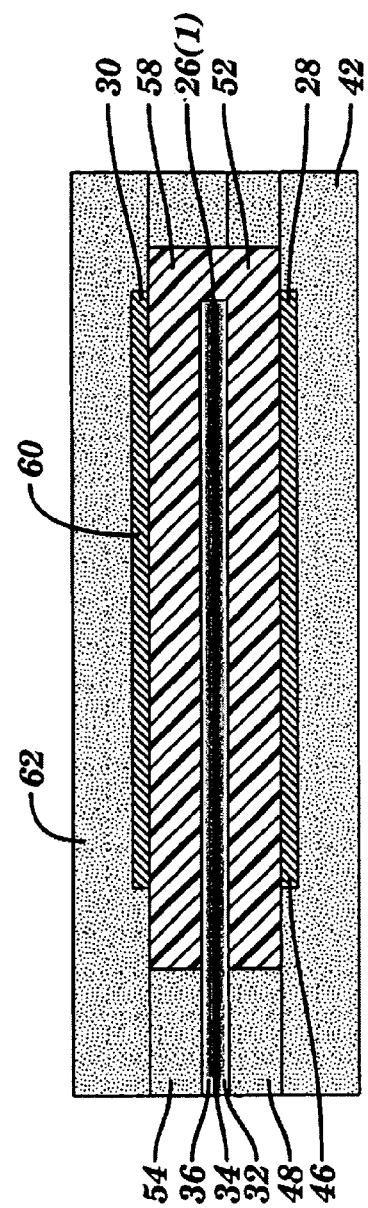

Referring to FIG. 6, a third insulating layer 62, such as silicon dioxide, is deposited over at least a portion of the second insulating layer 54 and the second electrode 30 to encapsulate the second electrode 30, although other types of materials can be used.

Referring to FIG. 7, holes or vias (not shown) are etched to the first and second electrodes 28 and 30 to provide contact points for electrically coupling and are also etched to provide access to the first and second sacrificial layers 52 and 58. The first and second sacrificial materials 52 and 58 are removed through the hole(s). A variety of techniques can be used to remove the sacrificial materials 52 and 58. For example, if the sacrificial material is polysilicon, the etchant may be xenon difluoride. Removing the first sacrificial material 52 forms a first compartment and removing the second sacrificial material 58 forms a second compartment in chamber 24. The chamber 24 with first and second compartments may be filled with a variety of different types of fluids, and/or materials, such as air or may be in a vacuum.

Referring to FIGS. 7 and 8, the resulting accelerometer 10(1) is shown. An accelerator monitoring system 38 is coupled to and provides an output of the potential difference between the first and second electrodes 28 and 30, although other types of devices could be coupled to the first and second electrodes 28 and 30.

The method for making the accelerometers 20(2) and 20(3) shown in FIGS. 11 and 12 is the same as the method described for making the accelerometers system 20(1) as described with reference to FIGS. 1–8, except as described herein. A mass 43(1) is formed on or otherwise connected to one side of one end of member 26(2) as shown in FIG. 11 and masses 43(1) and 43(2) are formed or otherwise connected to opposing sides of one end of member 26(2) as shown in FIG. 12, although other arrangements can be used. Additionally, a single layer 37 that can store fixed charge is deposited to from member 26(2), although member 26(2) may comprise other numbers of layers of material.

The method for making the accelerometers 20(4) and 20(5) shown in FIGS. 13 and 14 is the same as the method described for making the pressure transducer system 20(1) as described with reference to FIGS. 1–8, except as described herein. In this particular embodiment, member 26(1) is formed to extend across chamber 24 and to be connected along all sides to housing 22 to form a diaphragm, although other arrangements can be used. Additionally, a mass 43(1) is formed on or otherwise connected to one side of member 26(1) near the center as shown in FIG. 13, although other arrangements can be used, such as having more masses connected to member 26(1) or having no mass connected to member 26(1) as shown in FIG. 14.

The method for making the accelerometers 20(6) and 20(7) shown in FIGS. 15 and 16 is the same as the method described for making the pressure transducer system 20(1) as described with reference to FIGS. 1–8, except as described herein. In this particular embodiment, an insulating material or layer 63 is deposited to connect the electrode 28 to the member 26(1), although other arrangements can be used, such as simply depositing insulating layer 48 over electrode 28 and using insulating layer 48 to connect electrode 28 to member 26(1). Additionally, electrode 30 is fabricated to be flexible and responsive to an acceleration. The responsiveness of the electrode 30 can be adjusted based on factors, such as the thickness of the material which is deposited for electrode 30. Further, a mass 43(1) is formed on or otherwise connected to one side of electrode 30 near the center as shown in FIG. 15, although other arrangements can be used, such as having more masses connected to member 26(1) or having no mass connected to electrode 30 as shown in FIG. 16.

The method for making the accelerometer 20(8) shown in FIG. 17 is the same as the method described for making the pressure transducer systems 20(1), 20(6), and 20(7) as described with reference to FIGS. 1–8 and 15–16, except as described herein. In this particular embodiment, a conductive material is deposited to form electrode 30 to have one end connected to the housing 22 and the other end of the electrode 30 to be free to form a cantilever beam, although other arrangements can be used.

The operation of the accelerometer 20(1) in accordance with one embodiment will be described with reference to FIGS. 7 and 8. When the accelerometer 20(1) is exposed to an acceleration, the acceleration will cause a displacement of the member 26(1). As discussed above, the displacement of the member 26(1) with respect to the electrodes 28 and 30 produces a potential difference which is related to the acceleration. The acceleration monitoring device 38 can read and display this potential difference and/or can covert this potential difference to an acceleration reading using well known techniques, such as comparing the voltage to a stored look up table to obtain a reading for the acceleration.

By way of example only, if the stored charge density in member 26(1) is $1e12 e^-/cm^2$ and the separation between the electrodes 28 and 30 is 0.4 microns, a 1% non-equilibrium position of the member 26(1) with respect to electrodes 28 and 30 yields a potential difference greater that 0.5 volts.

The operation of the accelerometers 20(2) and 20(3) shown in FIGS. 11 and 12 are the same as that for the accelerometer 20(1), except as described herein. In this particular embodiment, when the accelerometer is exposed to an acceleration, the acceleration will cause the member 26(2) with the mass 43(1) in FIG. 11 to flex and will cause the member 26(2) with the mass 43(1) and mass 43(2) in FIG. 12 to flex. With the mass 43(1) and with the masses 43(1) and 43(2), the accelerometers 20(2) and 20(3) are more sensitive to monitoring acceleration. As described earlier, movement of at least one of the member 26(2) and the electrodes 28 and 30 results in a potential difference across electrodes 28 and 30 which can be converted to an accelerataion using well known techniques, such as comparing the measured potential difference against established tables to determine the acceleration.

The operation of the accelerometers 20(4) and 20(5) shown in FIGS. 13 and 14 are the same as that for the accelerometers 20(1)–20(3), except as described herein. In this particular embodiment, when the accelerometers 20(4) and 20(5) are exposed to an acceleration, the acceleration will cause the member 26(1) with the mass 43(1) and connected like a diaphragm in FIG. 13 to flex and will cause the member 26(1) without a mass and connected like a diaphragm in FIG. 14 to flex. With the mass 43(1), the accelerometers 20(4) is more sensitive to monitoring acceleration. As described earlier, movement of at least one of the member 26(2) and the electrodes 28 and 30 results in a potential difference across electrodes 28 and 30 which can be converted to an accelerataion using well known techniques, such as comparing the measured potential difference against established tables to determine the acceleration.

The operation of the accelerometers 20(6) and 20(7) shown in FIGS. 15 and 16 are the same as that for the accelerometers 20(1)–20(5), except as described herein. In this particular embodiment, when the accelerometers 20(6) and 20(7) are exposed to an acceleration, the acceleration will cause the electrode 30 with the mass 43(1) and connected like a diaphragm in FIG. 15 to flex and will cause the electrode 30 without a mass and connected like a diaphragm in FIG. 16 to flex. With the mass 43(1), the accelerometers 20(6) is more sensitive to monitoring acceleration. As described earlier, movement of at least one of the member 26(2) and the electrodes 28 and 30 results in a potential difference across electrodes 28 and 30 which can be converted to an accelerataion using well known techniques, such as comparing the measured potential difference against established tables to determine the acceleration.

The operation of the accelerometer 20(8) shown in FIG. 17 is the same as that for the accelerometers 20(1)–20(7), except as described herein. In this particular embodiment, when the accelerometer 20(8) is exposed to an acceleration, the acceleration will cause the electrode 30 that is connected like a cantilever beam in FIG. 17. As described earlier, movement of at least one of the member 26(2) and the electrodes 28 and 30 results in a potential difference across electrodes 28 and 30 which can be converted to an accelerataion using well known techniques, such as comparing the measured potential difference against established tables to determine the acceleration.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. An accelerometer comprising:

a non-conducting member with a stored static charge that remains substantially constant; and a pair of electrodes are spaced from and on substantially opposing sides of the non-conducting member from each other and are at least partially in alignment with each other, wherein the non-conducting member is movable with respect to the pair of electrodes or one of the pair of electrodes is movable with respect to the non-conducting member in response to an acceleration.

2. The system as set forth in claim 1 further comprising an acceleration system coupled to the pair of electrodes, wherein movement of the member or one of the pair of electrodes in response to the acceleration generates a potential difference in the pair of electrodes, the acceleration system outputting an acceleration based on the potential difference.

3. The system as set forth in claim 1 further comprising a housing with a chamber, the member is connected to the housing and extends at least partially across the chamber and the electrodes are connected to the housing.

4. The system as set forth in claim 3 wherein the member is connected to the housing to form a cantilever beam.

5. The system as set forth in claim 4 further comprising at least one mass coupled to the member in the chamber.

6. The system as set forth in claim 4 further comprising a pair of masses coupled to the member in the chamber.

7. The system as set forth in claim 3 wherein the member is connected to the housing to form a diaphragm.

8. The system as set forth in claim 7 further comprising at least one mass coupled to the member in the chamber.

9. The system as set forth in claim 3 wherein at least one of the pair of electrodes is connected to extend across the chamber in the housing to form a diaphragm.

10. The system as set forth in claim 9 further comprising at least one mass coupled to the at least one of the pair of electrodes.

11. The system as set forth in claim 3 wherein at least one of the pair of electrodes is connected to extend partially across the chamber in the housing to form a cantilever beam.

12. The system as set forth in claim 1 wherein the member comprises two or more dielectric layers.

13. The system as set forth in claim 1 wherein the member comprises a single dielectric layer.

14. The system as set forth in claim 1 wherein the member is made from one or more materials selected from a group consisting of silicon oxide, silicon dioxide, silicon nitride, aluminum oxide, tantalum oxide, tantalum pentoxide, titanium oxide, titanium dioxide, barium strontium titanium oxide.

15. A method for making an accelerometer, the method comprising:

providing a non-conducting member with a stored static charge that remains substantially constant; and providing a pair of electrodes, the electrodes are spaced from and on substantially opposing sides of the non-conducting member from each other and are at least partially in alignment with each other, wherein the non-conducting member is movable with respect to the pair of electrodes or one of the pair of electrodes is movable with respect to the non-conducting member in response to an acceleration.

16. The method as set forth in claim 15 further comprising providing an acceleration system coupled to the pair of electrodes, wherein movement of the member or one of the pair of electrodes in response to the acceleration generates a potential difference in the pair of electrodes, the acceleration system outputting an acceleration based on the potential difference.

17. The method as set forth in claim 15 further comprising providing a housing with a chamber, the member is connected to the housing and extends at least partially across the chamber and the electrodes are connected to the housing.

18. The method as set forth in claim 17 wherein the member is connected to the housing to form a cantilever beam.

19. The method as set forth in claim 18 further comprising at least one mass coupled to the member in the chamber.

20. The method as set forth in claim 18 further comprising a pair of masses coupled to the member in the chamber.

21. The method as set forth in claim 17 wherein the member is connected to the housing to form a diaphragm.

22. The method as set forth in claim 21 further comprising at least one mass coupled to the member in the chamber.

23. The method as set forth in claim 17 wherein at least one of the pair of electrodes is connected to extend across the chamber in the housing to form a diaphragm.

24. The method as set forth in claim 23 further comprising at least one mass coupled to the at least one of the pair of electrodes.

25. The method as set forth in claim 17 wherein at least one of the pair of electrodes is connected to extend partially across the chamber in the housing to form a cantilever beam.

26. The method as set forth in claim 15 wherein the member comprises two or more dielectric layers.

27. The method as set forth in claim 15 wherein the member comprises a single dielectric layer.

28. The method as set forth in claim 15 wherein the member is made from one or more materials selected from a group consisting of silicon oxide, silicon dioxide, silicon nitride, aluminum oxide, tantalum oxide, tantalum pentoxide, titanium oxide, titanium dioxide, barium strontium titanium oxide.

29. A method for measuring acceleration, the method comprising:

exposing at least one of a non-conducting member with a stored static charge that remains substantially constant or one of a pair of electrodes to an acceleration;

displacing the non-conducting member or one of the pair of electrodes in response to the acceleration;

producing a potential difference in the pair of electrodes which are spaced from and on substantially opposing sides of the non-conducting member from each other and are at least partially in alignment with each other; and outputting the potential difference which represents a measurement of the acceleration.

30. The method as set forth in claim 29 wherein the member comprises two or more dielectric layers.

31. The method as set forth in claim 29 wherein the member comprises a single dielectric layer.

32. The method as set forth in claim 29 wherein the member is made from one or more materials selected from a group consisting of silicon oxide, silicon dioxide, silicon nitride, aluminum oxide, tantalum oxide, tantalum pentoxide, titanium oxide, titanium dioxide, barium strontium titanium oxide.

33. The method as set forth in claim 29 further comprising attaching at least one mass to the at least one of the member or one of the pair of electrodes to increase sensitivity to the acceleration.

* * * * *